United States Patent Office 3,007,347
Patented Nov. 7, 1961

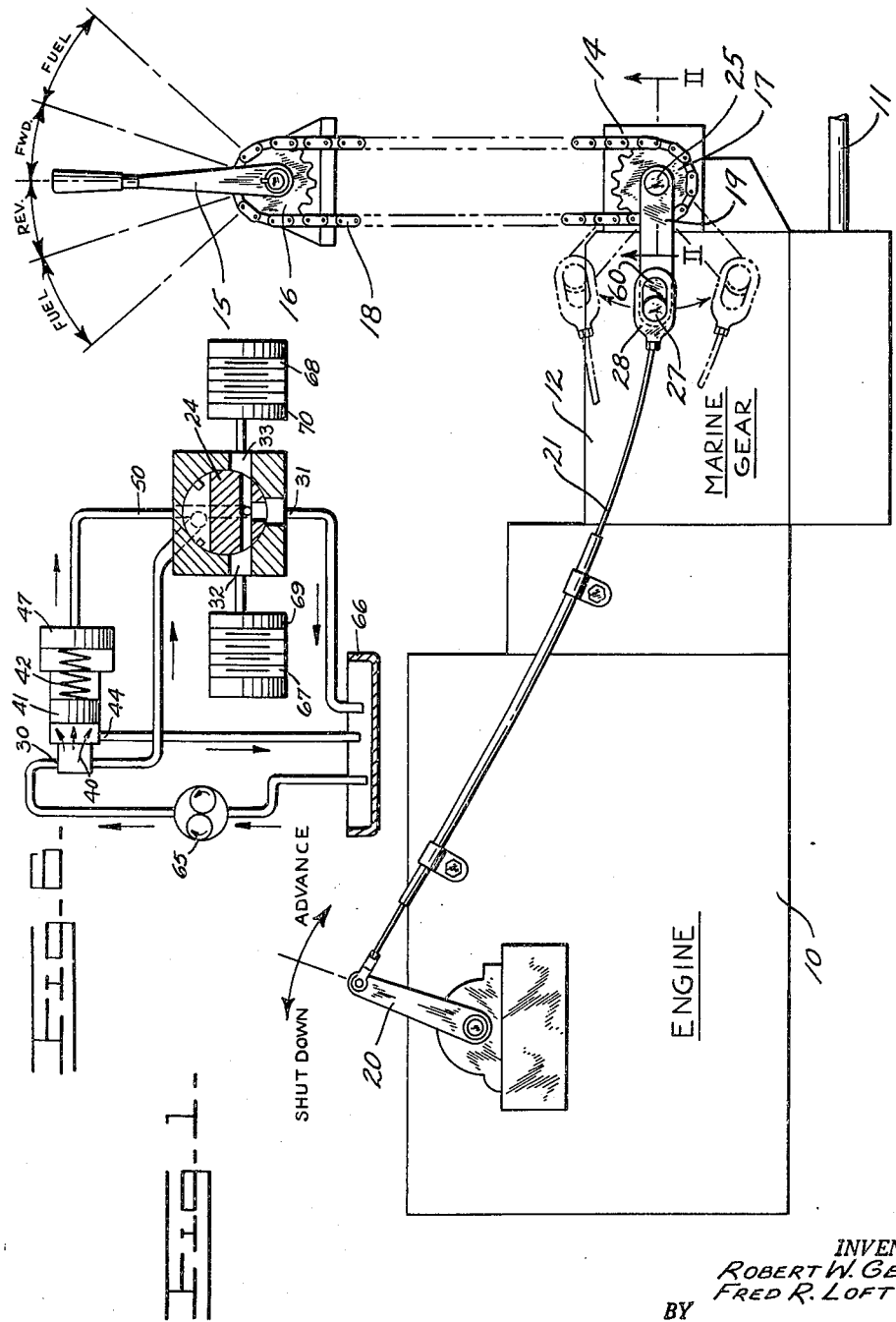

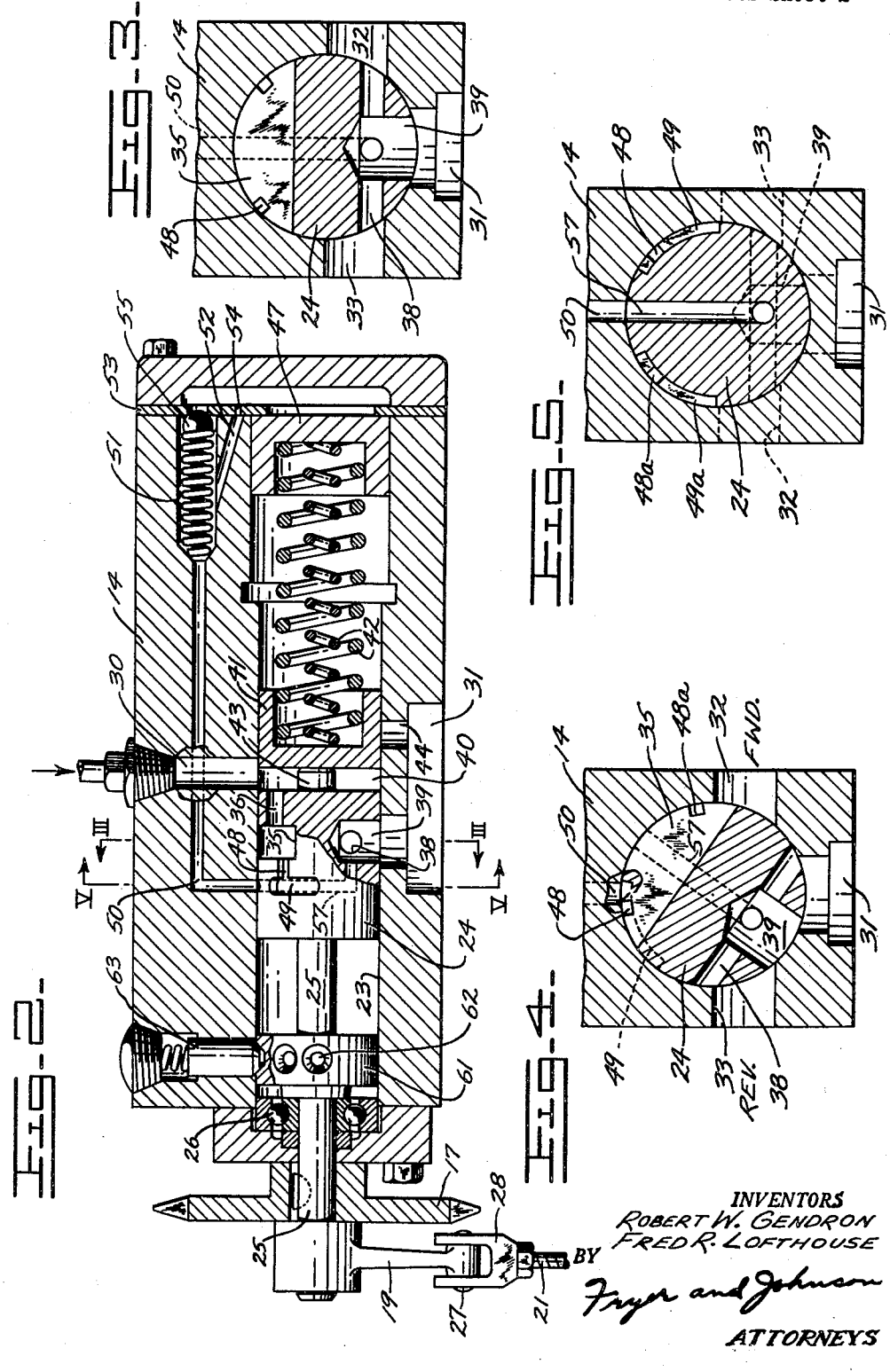

3,007,347
COMBINED CONTROL FOR ENGINE TRANS-
MISSION AND FUEL SUPPLY
Robert W. Gendron, Peoria, and Fred R. Lofthouse,
Pekin, Ill., assignors to Caterpillar Tractor Co., Peoria,
Ill., a corporation of California
Filed Aug. 19, 1959, Ser. No. 834,777
4 Claims. (Cl. 74—472)

This invention relates to control means for engines and particularly to engines having a forward and reverse gear selectively included for transmitting power by hydraulically actuated clutches.

Such transmissions are commonly employed for marine use and the invention will be described herein in its application to a marine engine and forward-reverse transmission, or so-called "marine gear," associated therewith for purposes of illustration.

A single lever is commonly employed for shifting marine gears and is movable in a plane through forward, neutral and reverse positions. Since it is desirable to decelerate the engine during shifting in either direction between the forward and reverse positions, it is also desirable to employ some connection between the shifting lever and fuel control means of the engine to effect this deceleration automatically and to provide for acceleration with the same lever employed for shifting the transmission. Where the marine gear is shifted by the application of pressure to the forward and reverse transmission clutches, which are hydraulically actuated, a valve for directing fluid under pressure selectively to the clutches is employed as the principal transmission control element. This gives rise to problems in attempting to provide a single lever control for the transmission and fuel supply since the design of the control valve does not ordinarily admit a sufficient angular movement to actuate fuel supply means after clutch engagement and still retain required pressure at the clutches for holding them in engagement.

It is the object of the present invention to overcome the aforementioned and other problems and to provide a combination single lever control for a marine gear and engine fuel supply and also to provide such a control where the control lever can readily be positioned remotely from the engine.

Further objects and advantages of the invention reside in the particular construction and arrangement of its several components and are made apparent by an understanding gained from the following specification wherein reference is made to the accompanying drawings.

In the drawings:

FIG. 1 is a schematic view of an engine having a marine gear and illustrating the application of the controls of the present invention thereto;

FIG. 2 is a central longitudinal sectional view through a valve of the present invention which controls the flow of fluid under pressure to the transmission clutches being taken on the line II—II of FIG. 1;

FIG. 3 is a sectional view taken on the line III—III of FIG. 2 with the parts of the valve in the neutral position;

FIG. 4 is a view like FIG. 3 with the valve adjusted to direct fluid to one of the transmission clutches;

FIG. 5 is a sectional view taken on the line V—V of FIG. 2; and

FIG. 6 is a schematic view of the hydraulic circuit of the present invention.

In FIG. 1 of the drawings, an engine is schematically illustrated at 10 for imparting power to a propeller shaft 11 through a forward reverse transmission or marine gear 12 of the hydraulically actuated type. A valve 14 is associated with the marine gear for selectively controlling the supply of hydraulic fluid under pressure to the forward and reverse clutches therein and this valve is adapted to be actuated by a control lever 15 which may be remotely positioned as for example in the pilot house of a ship and connected to the valve by any suitable actuating mechanism such for example as sprockets 16 and 17 and a chain 18. A lever 19 secured to and movable with the stem of the valve in the manner presently to be described in detail is connected with a fuel control lever 20 of the engine by means of a guided cable 21. The construction of the valve 14 is illustrated in detail in FIGS. 2 to 5, inclusive, where the body of the valve is shown as having a cylindrical bore 23 containing a rotatable valve element 24 of cylindrical form closely fitting the bore 23 and having a stem 25 extending outwardly through a suitable bearing and seal assembly 26 for the reception of the sprocket 17 by means of which the valve element 24 may be oscillated in the bore 23. The lever 19 is also fixed to the stem 25 and connected as by a pin 27 and clevis 28 with the guided cable 21.

Fluid under pressure preferably lubricating oil from the transmission sump in directed into the bore of the valve 14 through an inlet 30 and may be returned to the sump through a main outlet passage 31 or directed selectively upon oscillation of the valve element 24 to the forward transmission clutch through an outlet 32 on one side of the valve housing 14 or to the reverse clutch through an outlet 33 on the opposite side thereof. The valve element 24 has a transverse slot 35 disposed intermediate its ends and in its central or neutral position shown in FIG. 3 this slot is disposed above the clutch outlets 32 and 33 so that fluid entering the slot 35 through a port 36 communicating between the inlet and the slot cannot be directed to either of the clutches. Meanwhile a port 38 extending through the valve element in the same direction as and parallel to the slot 35 communicated with both of the outlets 32 and 33 and an intersecting port 39 to relieve pressure from both the forward and reverse clutches for return to the sump through the discharge 31.

The normal position of the valve parts in neutral and before the introduction of pressure is illustrated in FIG. 2 where the inlet passage 30 communicates with a chamber 40 in the bore 23 between one end of the valve element 24 and a piston 41 which is urged toward the valve element under the pressure of springs 42 to a position limited by a stop 43 on the valve element. When fluid under pressure is introduced with the parts in a neutral position, the pressure retracts the piston 41 against the spring force until it opens a port 44 communicating with the discharge opening 31 to permit return of the fluid to the sump.

From the neutral position illustrated in FIG. 3, the valve element 24 may be rotated in one direction to direct fluid to the forward transmission clutch or in the opposite direction to direct fluid to the reverse clutch. The forward position is illustrated in FIG. 4 where the element 24 has been rotated in a clockwise direction so that the slot 35 is in registry with the forward clutch port 32 while the ports 38 and 39 communicate with the sump outlet 31 to insure release of any pressure which might exist in the reverse clutch.

The full pressure of the actuating fluid is not immediately directed to the forward clutch upon movement of the valve element to the position shown in FIG. 4 because as will be recalled, the pressure in the neutral position is being exhausted through the port 44 with the piston 41 in its retracted position. However pressure in the slot 35 is communicated to the head of a piston 47 reciprocable in the valve bore and forming a seat for the springs 42. This piston is larger than the piston 41 which opposes it and the application of fluid pressure thereto therefore acts through the springs 42 to move the piston 41 to a position where it closes the discharge port 44 thus providing full pressure to the clutch. The pressure is communicated to the head of the piston 47 from the slot 35 through a longitudinal groove 48 and a circumferential groove 49 both formed in the valve element 24. Corresponding grooves 48a and 49a are provided on the opposite side of the valve element as shown in FIG. 5 for use when the valve is moved to the reverse position.

The groove 49 is positioned to register upon movement to the clutch engaging position shown in FIG. 4 with a passage 50 which communicates, through a check valve chamber 51, with a bypass passage 52 directing fluid to the head end of the piston 47. The plate 53 is provided with a restricting orifice 54 which registers with the passage 52 to limit the rate of flow of fluid and thereby regulate the speed at which the piston 47 moves and causes piston 41 to close the port 44. This affords a gradual closing of the port 44, and, therefore, a gradual increase in pressure to the clutch being engaged to prevent sudden or jerky engagement of the clutch. A spring loaded check valve 55 permits return of fluid under pressure from the head end of the piston 47, when the valve element is in neutral position, through the passage 50 which then communicates with an angular passage 57, best shown in FIG. 5, leading to the port 39 and discharge opening 31.

Returning to the position of clutch engagement illustrated in FIG. 4, it can be seen that further movement of the valve element 24 in a clockwise direction will retain pressure communication with the forward clutch and pressure communication with the piston 47 to insure continuing pressure of a value to maintain the clutch in engagement. The former is obtained by the size of the slot 35 which continues to register with the forward clutch outlet 32 and the latter is obtained by the length of the groove 49 which continues to register with the passage 50. In this manner the movement of the valve element, beyond the position necessary to engage the clutch, may be employed for advancing the fuel control lever of the engine through the mechanism illustrated in FIG. 1.

In FIG. 1, the control lever 15 is illustrated in its neutral position with the angularity required for operation of the forward and reverse clutches illustrated in broken lines and the additional angular movement possible for advancing the fuel control lever 20 similarly illustrated. Movement of the lever 15 in either direction from the neutral position shown in FIG. 1 effects corresponding movement of the lever 19 to exert a pull upon the cable 21 to advance the position of the fuel control lever 20 and increase the fuel supply to the engine after either one of the two transmission clutches has been fully engaged.

The position of the fuel control lever 20 shown in FIG. 1 may be considered the low idle or slow speed condition suitable for the engagement and disengagement of the clutches. Movement of the lever 20 in a counterclockwise direction from this position is necessary to shut the engine down. To enable such movement the clevis 28 may be provided with an elongated slot as illustrated at 60 to enable a slight movement of the cable 21 before the end of the slot engages the pin 27. Alternately any of several well known devices may be employed to disconnect lever 20 while the engine is being shut down.

Means to enable an operator to feel the position of the control lever may be provided. For example in FIG. 2, the stem 25 of the valve element is illustrated as provided with a collar-like member 61 with spaced depressions 62 therein engageable by a spring loaded detent 63 in the valve housing. Depressions such as those indicated at 62 may be provided at suitable spacing to indicate to the operator the neutral position, the clutch engaging position, and maximum throttle position.

In FIG. 6, a schematic circuit is illustrated wherein the rotary valve element 24 and the chamber of the spring pack 42 have been separated for the sake of simplicity. In this view, pump 65 is illustrated as arranged to withdraw fluid from a sump 66 and direct it through the chamber 40 in the valve in the manner herein described compressing the springs to permit return of the fluid to the sump through the outlet port 44. Forward and reverse clutches 67 and 68 are schematically illustrated as engageable by movement of pistons 69 and 70, respectively, which are actuated selectively as above described upon rotation of the valve element 24.

The structure herein designed enables control of the forward and reverse clutches of a marine gear and a fuel control member all through a single operating lever which may be remotely positioned as in the pilot house of a vessel and it insures that a fuel control member is automatically moved to a reduced speed setting at the time of engagement and disengagement of the clutches.

We claim:

1. A combined transmission and fuel supply control for an engine having a transmission with forward and reverse clutches, hydraulic actuators for said clutches and a fuel supply lever comprising, a source of fluid under pressure, a valve with a rotatable valve element, a fluid circuit including said source, said valve and said actuators, a lever secured to said rotatable valve element, a mechanical connection between said lever and said fuel supply lever, and means operable upon rotation of the valve element in either direction from a neutral position to direct fluid under pressure to an actuator to engage one of the clutches and upon further rotation in the same direction to affect increase in fuel supply through said mechanical connection.

2. A combined transmission and fuel supply control for an engine having a transmission with forward and reverse clutches, hydraulic actuators for said clutches and a fuel supply lever comprising, a source of fluid under pressure, a valve with a rotatable valve element, a fluid circuit including said source, said valve and said actuators, a lever secured to said rotatable valve element, a mechanical connection between said lever and said fuel supply lever, and means operable upon rotation of the valve element in either direction from a neutral position to direct fluid under pressure to an actuator to engage one of the clutches and upon further rotation in the same direction to affect increase in fuel supply through said mechanical connection while the engaged clutch is held in engagement.

3. A combined transmission and fuel supply control for an engine having a transmission with forward and reverse clutches, hydraulic actuators for said clutches and a fuel supply lever comprising, a source of fluid under pressure, a valve with a rotatable valve element, a fluid circuit including said source, said valve and said actuators, a lever secured to said rotatable valve element, a mechanical connection between said lever and said fuel supply lever, and means operable upon rotation of the valve element in either direction from a neutral position to direct fluid under pressure gradually to one of said actuators until full clutch engaging pressure it attained and upon further rotation in the same direction to affect increase in fuel supply through said mechanical connection.

4. A combined transmission and fuel supply control for an engine having a transmission with forward and reverse clutches, hydraulic actuators for said clutches and a fuel supply lever comprising, a source of fluid under pressure, a valve with a rotatable valve element, a fluid circuit including said source, said valve and said actuators, a lever secured to said rotatable valve element, a mechanical connection between said lever and said fuel supply lever, means operable upon rotation of the valve element in one direction to admit fluid gradually to one of said clutch actuators until full clutch engaging pressure is attained and upon rotation in the opposite direction to admit fluid gradually to the actuator of the other clutch until full engaging pressure is attained, and means including said mechanical connection with the fuel supply lever operable upon further rotation of the valve in either direction to increase fuel supply to the engine while full pressure is retained at the engaged clutch.

References Cited in the file of this patent
UNITED STATES PATENTS

| | | |
|---|---|---|
| 2,426,064 | Stevens | Aug. 19, 1947 |
| 2,674,355 | Keel | Apr. 6, 1954 |
| 2,944,645 | Markham | July 12, 1960 |